US008275541B2

(12) United States Patent
Levy

(10) Patent No.: US 8,275,541 B2
(45) Date of Patent: Sep. 25, 2012

(54) AUTOMATIC DETERMINATION OF AIRCRAFT HOLDING LOCATIONS AND HOLDING DURATIONS FROM AIRCRAFT SURVEILLANCE DATA

(75) Inventor: Benjamin S. Levy, Manlius, NY (US)

(73) Assignee: Saab Sensis Corporation, Wilmington, DE (US)

( * ) Notice: Subject to any disclaimer, the term of this patent is extended or adjusted under 35 U.S.C. 154(b) by 0 days.

(21) Appl. No.: 13/396,938

(22) Filed: Feb. 15, 2012

(65) Prior Publication Data

US 2012/0143483 A1 Jun. 7, 2012

Related U.S. Application Data

(62) Division of application No. 12/325,405, filed on Dec. 1, 2008, now Pat. No. 8,145,415.

(60) Provisional application No. 60/990,985, filed on Nov. 29, 2007.

(51) Int. Cl.
*G06F 19/00* (2011.01)
*G06G 7/70* (2006.01)
*G06G 7/76* (2006.01)

(52) U.S. Cl. ............ 701/120; 701/1; 701/117; 701/119; 701/300; 340/938; 340/945; 340/500; 340/527; 708/200; 708/202; 708/445; 708/805

(58) Field of Classification Search ................ 701/1, 25, 701/16, 117, 119, 120, 200, 201, 300; 340/934, 340/938, 945, 951, 973; 708/146, 200–236, 708/445, 533, 805, 809; 712/2, 3, 4, 7, 32, 712/221, 222; 703/2, 6, 7, 8
See application file for complete search history.

(56) References Cited

U.S. PATENT DOCUMENTS

| | | | | |
|---|---|---|---|---|
| 6,650,948 | B1 | 11/2003 | Atkinson et al. | |
| 7,501,976 | B2 | 3/2009 | Manor | |
| 7,542,844 | B2 | 6/2009 | Kumagai et al. | |
| 7,616,978 | B2 * | 11/2009 | Piekarz | 455/575.9 |
| 7,640,098 | B2 * | 12/2009 | Stenbock et al. | 701/528 |
| 7,688,228 | B2 * | 3/2010 | Tanizaki et al. | 340/995.12 |
| 8,055,440 | B2 * | 11/2011 | Shintani et al. | 701/420 |
| 8,155,669 | B2 * | 4/2012 | Ziskind et al. | 455/456.3 |
| 2007/0259674 | A1 * | 11/2007 | Neef et al. | 455/456.1 |
| 2008/0036586 | A1 * | 2/2008 | Ohki | 340/539.13 |
| 2008/0147304 | A1 * | 6/2008 | Pai et al. | 701/115 |
| 2008/0167937 | A1 * | 7/2008 | Coughlin et al. | 705/9 |
| 2008/0195306 | A1 * | 8/2008 | Moinzadeh et al. | 701/201 |
| 2008/0319653 | A1 * | 12/2008 | Moshfeghi | 701/208 |
| 2010/0161490 | A1 * | 6/2010 | Alrabady et al. | 705/50 |
| 2011/0018759 | A1 * | 1/2011 | Bennett et al. | 342/357.4 |

* cited by examiner

*Primary Examiner* — Hussein A. Elchanti
*Assistant Examiner* — Rami Khatib
(74) *Attorney, Agent, or Firm* — Burr & Brown

(57) ABSTRACT

A method using airport surveillance data to output a location of a delay and an amount of time a vehicle is subjected to the delay during a movement of the vehicle between two locations, the delays being observed in the surveillance data as a knot of several data points. A first method is used to identify proposed knots based on distances between individual data points within the data. A second method is used to identify proposed knots based on the speed of the vehicle. Another method can be used to separate proposed knots have been incorrectly joined together. This method performs the separation by arranging the data points into a two-dimensional grid to form clusters of grid cells having data points. The location of the individual cells is then analyzed to determine whether clusters should be separated. Each of the remaining clusters defines a hold where the vehicle is delayed.

9 Claims, 7 Drawing Sheets

AUTOMATIC DETERMINATION OF AIRCRAFT HOLDING LOCATIONS AND HOLDING DURATIONS FROM AIRCRAFT SURVEILLANCE DATA

FIELD OF THE INVENTION

The invention relates to a method and computer program that determines aircraft holding locations and holding durations on the surface of airport, as directed by air traffic controllers and followed by pilots of aircraft.

BACKGROUND OF THE INVENTION

The demands placed upon the worldwide air traffic system are changing at a rapid pace, because more aircraft are requiring the use of the same airspace and airports, placing greater demands on airport capacity. Due to energy demands and consumer requirements, commercial air carriers are increasingly utilizing smaller, more efficient aircraft in a "hub and spoke" arrangement, where a majority of flights initiate or terminate at an airport facility located near a large metropolitan area. Further, due to the fact the commercial air carriers are unable to meet the timing and convenience required by an increasing number of consumers, the air traffic system is being required to handle an increasing number of general aviation aircraft.

The increased number of flights operating from hub airports, both domestic and international, has resulted in significant air traffic congestion problems at these locations. A seemingly obvious solution to such congestion problems would be to merely add more runways, to add more taxiways, and to add more passenger terminals. Each of these potential solutions is fraught with problems. One such problem is that the real estate required for such additions is simply not available in many instances for additions to existing airports. For example, 468 homes adjacent to the Cleveland Hopkins Airport needed to be razed to add a third runway to that airport. Situations such as this raise the cost of adding even one new runway to inordinate levels.

Further, building entirely new airports creates significant other problems. One such problem is that an entirely new airport costs a large amount of taxpayer funds and takes a significant amount of time. For example, the new Denver International Airport cost over five billion dollars (US) and took longer than six years to complete. Another problem is that any new or proposed airport will likely be built even further from a respective metropolitan area thin an existing airport, the added distance adding cost and inconvenience to most every traveler's plans.

Similarly, increasing the number of runways and passenger terminals to any airport greatly increases the complexity and time required for aircraft and passengers alike to navigate. As one can easily imagine, airports having only one runway and only one passenger terminal will require only a limited number of taxiways for the passage of aircraft to and from the passenger terminal. Also, as one can easily imagine, when the number of runways and passenger terminals is increased, the number of taxiways servicing those runways and passenger terminals exponentially increases. This increase alone comes with many problems.

Aircraft movement between a runway and a passenger terminal while on taxiways is a highly monitored activity with significant human involvement. Aircraft, regardless of their size, are built for safe and efficient travel during operation in the air. Aircraft are, however, large, ungainly land vehicles with significant visibility disabilities. Accordingly, aircraft pilots typically rely on air traffic controllers for orchestrating the guidance of their aircraft to and from runways on taxiways of large airports. As one can easily imagine, the task of individually directing the movement of a large aircraft, where the pilot is unable to see the extents of the aircraft, through a maze of taxiways is daunting task.

During times of optimal operational efficiency, air traffic controllers are able to direct aircraft along a taxi-path between an arrival/departure runway and a gate area without requiring the pilot to delay or hold at a particular location for an amount of time. These holds are caused by a variety of reasons such as the absence of available space within the passenger terminal area, that aircraft must be sequenced for arrival to a runway/passenger terminal, that the aircraft must be deiced, that there is an arrival delay at a destination airport and/or that there is overcrowding of the taxiways.

There are published holding areas that can be used as a reference for the air traffic controllers under particular circumstances, such as for deicing. It should be noted, however, that air traffic controllers often create their own holding locations for aircraft depending on their own experiences and their own interpretation of the current airport requirements. Accordingly, the holding locations used by aircraft may differ significantly from the published holding areas.

Any time an aircraft is held at a particular location by air traffic controllers increases the amount time that the aircraft is operating while traversing the distance between the runway and the gate area. This increased amount of time beyond an ideal circumstance where the aircraft is not subjected to any holds is the holding duration. Any amount of holding duration results in substantial additional fuel costs, substantial environmental impact, and substantial additional personnel costs. For example, aircraft engines are designed to develop efficient power while operating at a high altitude. While on the ground, these engines are inefficiently used to generate electrical power for the operation of the aircraft, used to power air conditioning systems, and used to propel the aircraft. Even through these tasks can be performed more efficiently by ground based power supply units, it is nearly impossible to have an aircraft attached to a ground power supply unit while the aircraft is traversing the distance between a runway and a passenger terminal.

Further, because the aircraft engines inefficiently produce power while on the ground, the aircraft produce large amounts of carbon dioxide ($CO_2$) and other pollutants while in operation on the ground. Because of the effects that $CO_2$ may have on climate change and the effect that the other pollutants may have on the air quality surrounding the airport, any amount of time that an aircraft spends in operation on the ground causes significant environmental impacts.

SUMMARY OF THE INVENTION

The present invention helps to reduce wasted fuel, reduce environmental impacts, reduce wasted personnel time, and increase safety by concretely objectifying the holding locations and holding durations the aircraft, or other ground vehicles, as directed by the air traffic controllers. Such concrete determinations of the holding locations and holding durations will aid airport authorities to determine what, if any, changes need to be made to airport layouts and usages. Such concrete determinations will also allow air carriers to more accurately determine the time required for one of their aircraft, or other vehicles, to traverse the distance between the runway and gate areas.

In accordance with one embodiment of the present invention, a first method is provided for using airport surveillance data to output a location of a delay and an amount of time a vehicle is subjected to a delay during a movement of the vehicle between a first location and a second location. The first method includes a set of steps beginning with the step of obtaining a time-ordered sequence of data points representing the movement of the vehicle. Each data point includes an (x) position coordinate and a (y) position coordinate at a particular time represented by a time stamp. Using these data points, a vector (v) is created including a plurality of elements by performing the following steps for each data point in the time ordered sequence. Each of the elements corresponds to one of the respective data points from the time ordered sequence.

The vector (v) creating steps including the step of calculating a radial distance ($r_{i,j}$) between the (x) and (y) coordinates of the data point (i) and the (x) and (y) coordinates of each of the remaining data points (j), each radial distance ($r_{i,j}$) being equal to $[(x_i-x_j)^2+(y_i-y_j)^2]^{1/2}$. The vector (v) creating steps further including the step of recording one of a zero (0) entry and a number (N) entry as the element in the vector (v) corresponding to the data point (i). The zero (0) entry is added if there are no radial distances ($r_{i,j}$) that are less than a predetermined distance ($r_{min}$). The number (N) entry is the number of radial distances ($r_{i,j}$) that are equal to or less than the predetermined distance ($r_{min}$) from the $i^{th}$ x,y location.

The first method further include replacing all of the number (N) entries in the vector (v) that have a value greater than a predetermined value (K) with a one (1) entry, and replacing all of the number (N) entries in the vector (v) that have a value equal to or less than the predetermined value (K) with a zero (0) entry. Each zero (0) entry in the vector (v) is replaced with a one (1) entry if the zero (0) entry is a part of a sequence of consecutive zero (0) entries, the sequence length being less than a predetermined value (S). This replacement reduces the number of sequences denoted by a one (1), such that sequences are not unnecessarily divided spatially. The first method further includes defining a starting index and a stopping index within the vector (v) for each sequence of consecutive one (1) entries, each of the sequences of consecutive one (1) entries defining a proposed hold (knot). The term "knot" is used because the time-ordered x,y locations that form a holding event and location appear as a cluster of points that resemble a knotted string. For each proposed knot (ki), the following steps are performed.

The steps include finding a mean location (E(x), E(y)) for the proposed knot (ki), the mean location being the average of the (x) and (y) coordinates of the data points corresponding to the sequence of consecutive (1) entries in the proposed knot (ki). The steps further include calculating a radial distance (kr) between the mean location (E(x), E(y)) of the proposed knot and the (x) and (y) coordinates of each respective data point corresponding to the sequence of consecutive (1) entries in the proposed knot (ki). Each radial distance (kr) is equal to $[(x_1-E(x))^2+(y_i-E(y))^2]^{1/2}$. The steps further include computing a scale factor (m), where $m=\log_e$ (length (r))/OSR, and dropping any data points from being associated with the proposed knot if $r \geqq m \cdot std(r)+mean(r)$.

The first method further includes eliminating any proposed knots that have less than a predetermined number (d) of data points remaining, and identifying the data points associated with any remaining proposed knot as being associated with the respective proposed knot. The data points identified are then saved onto a computer readable medium for at least one of review by an individual, production of a graphical display on a computer terminal, and production of a presentation document identifying those data points as being associated with one of the proposed knots.

In accordance with one embodiment of the present invention, the predetermined distance ($r_{min}$) is between 15 feet and 30 feet. Preferably, the predetermined distance ($r_{min}$) is 15 feet. The predetermined distance ($r_{min}$) will vary based on an analysis of site specific data.

In accordance with one embodiment of the present invention, the predetermined value (K) is between 5 and 15, and is preferably between 8 and 12. In accordance with one embodiment of the present invention, the predetermined value (K) is 10.

In accordance with one embodiment of the present invention, the predetermined value (S) is between 2 and 10, and is preferably between 4 and 8. In accordance with one embodiment of the present invention the predetermined value (S) is 5.

In accordance with one embodiment of the present invention, the predetermined variable (OSR) is between 5 and 10. In accordance with one embodiment of the present invention the predetermined variable (OSR) is 7.

In accordance with one embodiment of the present invention the predetermined number (d) is between 2 and 15, and is preferably between 5 and 10. In accordance with one embodiment of the present invention the predetermined number (d) is 5.

In accordance with one embodiment of the present invention, a second method is provided for using airport surveillance data to output a location of a delay and an amount of time a vehicle is subjected to a delay during a movement of the vehicle between a first location and a second location. The second method includes obtaining a time-ordered sequence of data points representing the movement of the vehicle. Each data point includes an (x) position coordinate and a (y) position coordinate at a particular time represented by a time stamp. The second method further includes creating a vector (sv) including a plurality of elements, each of the elements corresponding to one of the respective data points from the time ordered sequence, each of the elements being a ground speed associated with the respective data point. The second method further includes replacing all of the ground speed entries in the vector (sv) with one of a zero (0) entry and a one (1) entry. The one (1) entry is added if the ground speed entry is less than the predetermined minimum ground speed ($GS_{min}$) or if the reported ground speed is a NaN (i.e., not a number) (e.g., an artifact of the data creating process where a number is divided by zero). The zero (0) entry is added if the ground speed is equal to or greater than the predetermined minimum ground speed ($GS_{min}$) and the number is not a NaN. The second method further includes defining a starting index and a stopping index within the vector (sv) for each sequence of consecutive one (1) entries, each of the sequences of consecutive one (1) entries defining a proposed knot. The second method further includes defining a time duration of each of the proposed knots using the time stamps of the respective data points, and eliminating any proposed knot having a duration of less than a predetermined time duration (T). The second method further includes performing the following steps for each remaining proposed knot (pi).

The steps include finding a mean location (E(x), E(y)) for the proposed knot (pi), the mean location being the average of the (x) and (y) coordinates of data points corresponding to the sequence of consecutive (1) entries in the proposed knot (pi). The steps further include calculating a radial distance (pr) between the mean location (E(x), E(y)) of the proposed knot (pi) and the (x) and (y) coordinates of each respective data point corresponding to the sequence of consecutive (1) entries in the proposed knot (pi). Each radial distance (pr) is equal to $[(x_i-E(x))^2+(y_i-E(y))^2]^{1/2}$. The steps further include computing a scale factor (m), where $m=\log_e$ (length (r))/OSR, and keeping the data points associated with the proposed knot if r is less than the larger of the two values from the inequality, r<max (maxDistance, m·std(r)). For example, maxDistance can be a value between 50 feet and 100 feet.

The second method further includes merging any of the proposed knots that overlap, and identifying the data points associated with any remaining proposed knot as being associated with the respective proposed knot. The second method further includes saving the data points identified onto a computer readable medium for at least one of review by an individual, production of a graphical display on a computer terminal, and production of a presentation document identifying those data points as being associated with one of the proposed knots.

In accordance with one embodiment of the present invention, the predetermined minimum ground speed ($GS_{min}$) is between 1 and 5 knots, and preferably between 1 and 3 knots. In accordance with one embodiment of the present invention, the predetermined minimum ground speed ($GS_{min}$) is 1.9 knots.

In accordance with one embodiment of the present invention, the predetermined time duration (T) is between 10 seconds and 120 seconds. In accordance with one embodiment of the present invention, the predetermined time duration (T) is 30 seconds.

In accordance with one embodiment of the present invention, the predetermined variable (OSR) is between 5 and 10. In accordance with one embodiment of the present invention, the predetermined variable (OSR) is 7.

In accordance with one embodiment of the present invention, a third method is provided for using airport surveillance data to output a location of a delay and an amount of time a vehicle is subjected to a delay during a movement of the vehicle between a first location and a second location. The third method includes performing the first method and performing the second method and merging the output data of the first two methods. The third method further includes outputting a value of zero (0) if the first method and the second method do not identify any proposed knots, merging proposed knots when the first method outputs a proposed knot including data points that are not identified as part of a proposed knot outputted by the second method, and merging proposed knots when the second method outputs a proposed knot including data points that are not identified as part of a proposed knot outputted by the first method. The third method further includes merging data points into a new proposed knot such that the resultant list of data points associated with the new proposed knot is a superset of the list of individual data points of proposed knots from both methods when the first method identifies a proposed knot with individual locations that overlap, supersede, or are subsumed by the individual locations of one of the proposed knots identified by the second method, and merging data points into a new proposed knot when the resultant list of data points associated with the new proposed knot is a superset of the list of individual locations of proposed knots from both methods when the second method identifies a proposed knot with individual data points that overlap, supersede, or are subsumed by the individual locations of one of the proposed knots identified by the first method. The third method further includes identifying the data points associated with any remaining proposed knot as being associated with the respective proposed knot, and saving the data points identified onto a computer readable medium for at least one of review by an individual, production of a graphical display on a computer terminal, and production of a presentation document identifying those data points as being associated with one of the proposed knots.

In accordance with one embodiment of the present invention, a fourth method is provided to split any knots that were incorrectly merged due to artifacts or jitter in the surveillance data, or severe multipath returns, for example. The fourth method includes obtaining data points associated with at least one proposed knot, and converting the (x) and (y) coordinates for each data point associated with each of the proposed knots into a row/column address. Each row/column address falls into one of a plurality of two-dimensional cells arranged in a two-dimensional grid, the grid having a predetermined spacing (gs), a cell having at least one of the data points falling therein being an active cell. The fourth method further includes determining recursively a list of clusters of active cells that are comprised of contiguous active cells. The grouping of active cells into one set of contiguous cells is determined by requiring all cells in the group to be within $\sqrt{2}$ times the distance measured from the center of an active cell to the center of another active cell (i.e., distance between cell centers). The fourth method further includes grouping any of the clusters whose distances are not further than $\sqrt{2}$ times the distance measured from the center of an active cell to the center of another active cell, and identifying the data points associated with their respective clusters, those data points being representative of a hold where the vehicle is delayed. The fourth method further includes saving the data points representing the identified knots onto a computer readable medium for at least one of review by an individual, production of a graphical display on a computer terminal, and production of a presentation document identifying those data points as being associated with the holds.

In accordance with one embodiment of the present invention, the predetermined spacing (sg) is between 5 and 50 feet. In accordance with one embodiment of the present invention, the predetermined spacing (sg) is 15 feet.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

While it should be understood that the present invention can be used to analyze the movement of all types of vehicles, the present invention will be more fully discussed below with reference to aircraft.

Figure 1:
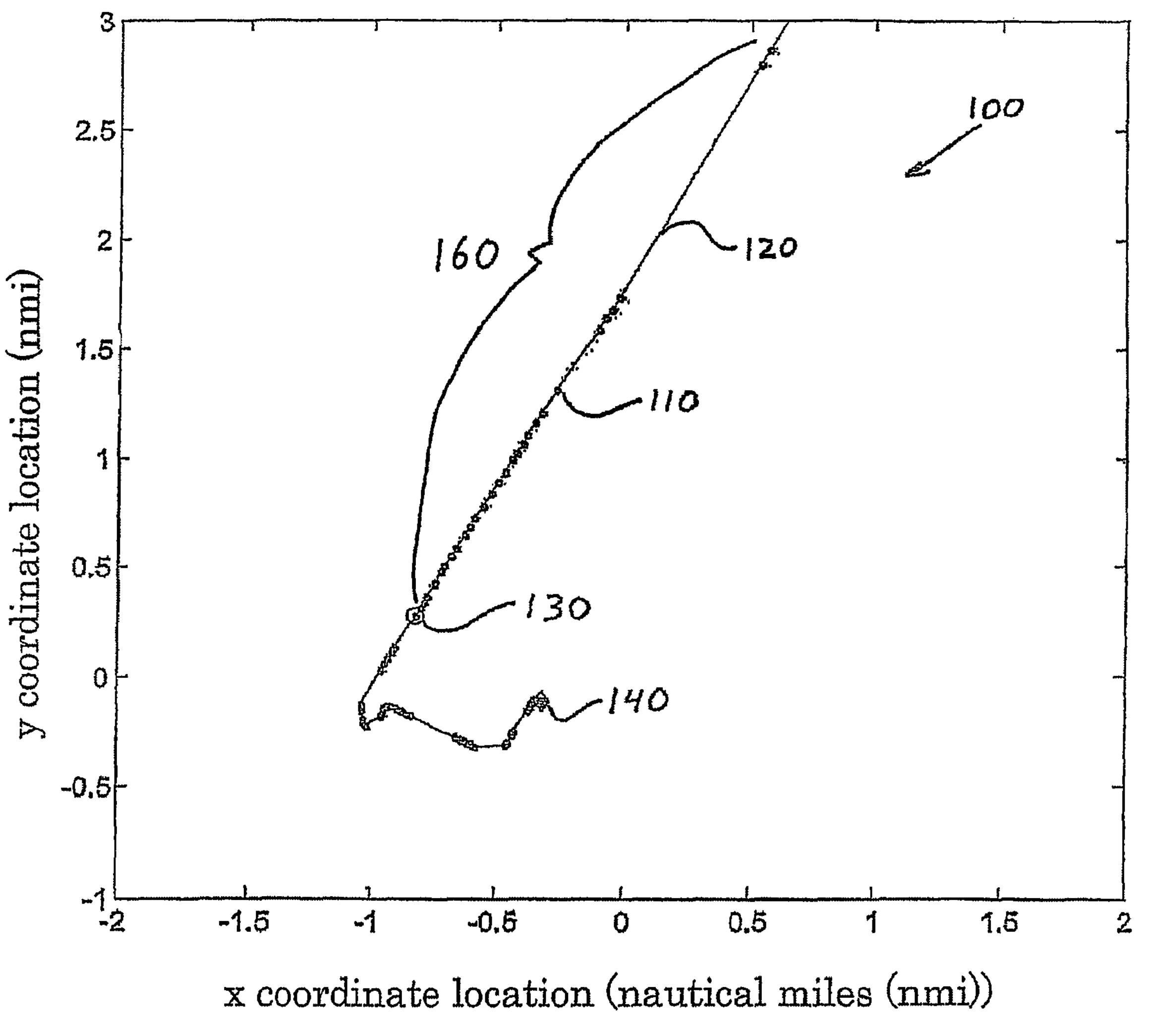
FIG. 1 is a Cartesian plot of data points representing the movement of an aircraft including the aircraft's path from the arrival to the airport area to the passenger terminal area.

A sequence 100 of individual data points 110 is shown in FIG. 1. Each data point 110 includes at least an (x) position coordinate and a (y) position coordinate as plotted on the Cartesian plane. Each data point 110 also has a sequential time stamp that is not shown. As is well known in the art, the time stamp can take any form such as Coordinated Universal Time (UTC), local time, or a basic incrementing counter. These data points 110 are collected for aircraft in and around an airport environment using airport surveillance equipment that utilizes techniques such as, multilateration based on ATCRBS, automatic dependent surveillance-broadcast (ADS-B), on-board GPS position tracking, etc.

In a typical arrival, as shown in FIG. 1, data points 110 are collected showing a path 120 of an aircraft during its final approach 160 and during its taxi between a wheels-on event 130, which is typically a point during the aircraft's landing roll-out, and a gate-in event 140, which is a point where the aircraft is considered to be at a passenger terminal or other final destination on the airport. It should be understood that the destination may be an intermediate destination, such as a transition area between airport ground control and gate ground control.

It should be understood that for the purpose of the remaining disclosure, an aircraft being analyzed using the methods described herein can be passing from the on event 130 to the in event 140 or vice versa. The direction that the aircraft travels is not significant to the determination of associated holding locations and holding durations.

Figure 2:
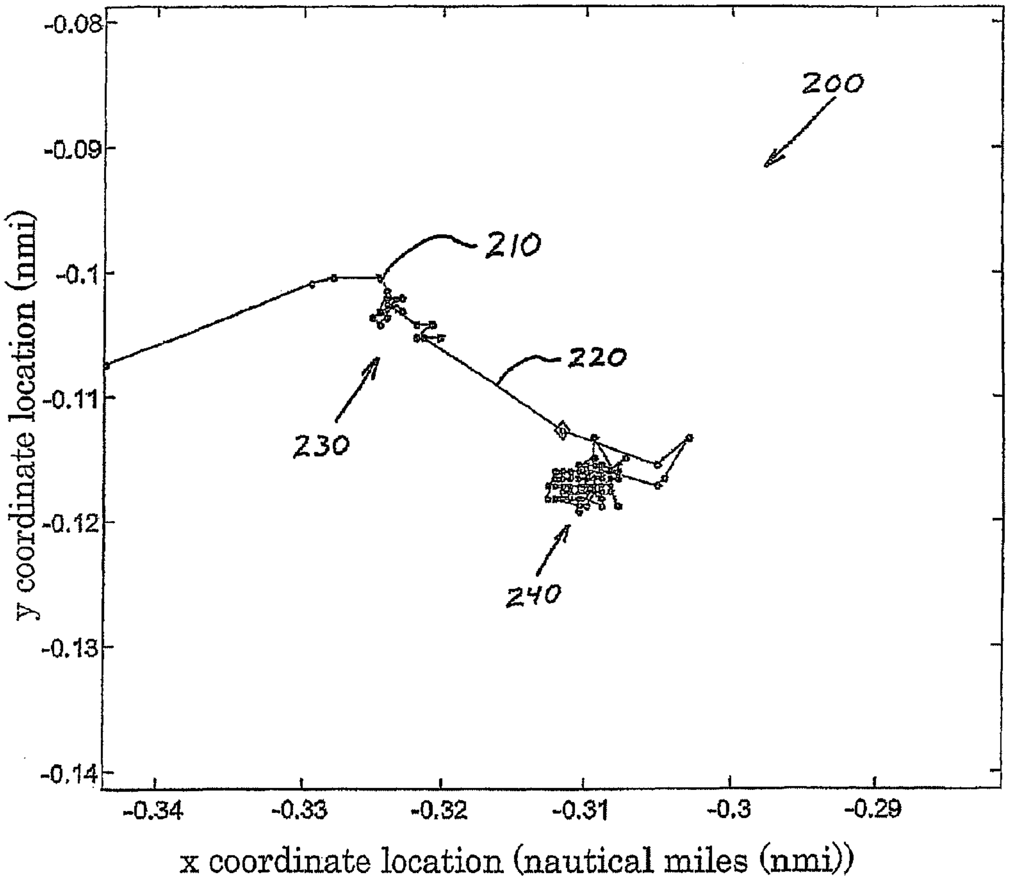
FIG. 2 is a Cartesian plot of data points representing the movement of another aircraft including the aircraft's path on the ground between a runway and a passenger terminal area.

As shown in FIG. 2, a sequence 200 of individual data points 210 for a given aircraft path 220 will not precisely follow the exact location of the aircraft. In particular, due to expected positional errors in the information provided by the airport surveillance equipment, an aircraft at rest may still show random movement, which creates a displayed path that has the appearance of a knot 230, 240 (see FIG. 4). Because each of these knots 230, 240 is an indicator of an aircraft holding in a particular location for a duration of time, the methods described more fully below seek to accurately identify these particular locations and durations of holding without mischaracterizing the two knots 230, 240 as being one knot.

A first method for identifying which data points of a particular sequence are associated with a particular knot is as follows. After obtaining the time-ordered sequence 200 of data points 210, the next step is to create a vector (v) using information derived from the individual data points 210. Each element in the vector corresponds to one of the respective data points 210. For example, because there are seventy-five data points 210 present in sequence 200, there will be seventy five entries in the vector (v), as is represented below in Table 1.

TABLE 1

Sequence 200 Including an Unpopulated Vector (v)

| Data point (Index) | Location | Time Stamp | Vector (v) |
|---|---|---|---|
| 1 | (x) and (y) Coordinate Data Point 1 | Time at Location 1 | |
| 2 | (x) and (y) Coordinate Data Point 1 | Time at Location 2 | |
| 3 | (x) and (y) Coordinate Data Point 1 | Time at Location 3 | |
| 4 | (x) and (y) Coordinate Data Point 1 | Time at Location 4 | |
| 5 | (x) and (y) Coordinate Data Point 1 | Time at Location 5 | |
| . . . | . . . | . . . | . . . |
| 70 | (x) and (y) Coordinate Data Point 1 | Time at Location 6 | |
| 71 | (x) and (y) Coordinate Data Point 1 | Time at Location 7 | |
| 72 | (x) and (y) Coordinate Data Point 1 | Time at Location 8 | |
| 73 | (x) and (y) Coordinate Data Point 1 | Time at Location 9 | |
| 74 | (x) and (y) Coordinate Data Point 1 | Time at Location 10 | |
| 75 | (x) and (y) Coordinate Data Point 1 | Time at Location 11 | |

Each entry, which corresponds to a particular data point 210, in the vector (v) will be either a zero (0) entry or a number (N) entry.

To determine the appropriate number that is to be placed in a respective element of vector (v), a radial distance ($r_{i,j}$) between the (x) and (y) coordinates of the respective data point must be calculated. This calculation is, for example, $(r_{i,j})=[(x_i-x_j)^2+(y_i-y_j)^2]^{1/2}$. Such calculations can be characterized as follows in Table 2.

TABLE 2

Radial Distances From Data Point 1 to the Remaining Data Points

| Data Point (Index) | Radial Distance ($r_{i,j}$) |
|---|---|
| 1 | N/A |
| 2 | Radial distance between data points i = 1 and j = 2 |
| 3 | Radial distance between data points i = 1 and j = 3 |
| . . . | . . . |
| 70 | Radial distance between data points i = 1 and j = 70 |
| 71 | Radial distance between data points i = 1 and j = 71 |
| 72 | Radial distance between data points i = 1 and j = 72 |
| 73 | Radial distance between data points i = 1 and j = 73 |
| 74 | Radial distance between data points i = 1 and j = 74 |
| 75 | Radial distance between data points i = 1 and j = 75 |

The next step is to determine whether there are any radial distances ($r_{i,j}$) for a particular data point 210 that are less than a predetermined distance ($r_{min}$), which is merely a variable determined based factors such as the typical error observed by the airport surveillance equipment, the size of the airport, etc. The predetermined distance ($r_{min}$) is typically between 15 feet and 30 feet. In the present case, the predetermined distance ($r_{min}$) is 30 feet. The predetermined distance ($r_{min}$) will vary based on an analysis of a site specific data.

If there are no radial distances ($r_{i,j}$) for a particular data point 210 that are less than the predetermined distance ($r_{min}$), then a zero (0) entry is added into the vector (v) in Table 1. If there are radial distances ($r_{i,j}$) for a particular data point 210 that are less than the predetermined distance ($r_{min}$), then the number of those radial distances ($r_{i,j}$) that are less than the predetermined distance ($r_{min}$) is entered as a number (N) entry.

Once the vector (v) is complete with either a zero (0) entry or a number (N) entry for each data point 210, the vector (v) is then examined to replace all of the number (N) entries with a zero (0) entry or a one (1) entry. All of the number (N) entries having a value greater than a predetermined value (K) are to be changed to a one (1) entry, and all of the number (N) entries having a value equal to or less than the predetermined value (K) are to be changed to a zero (0) entry. The vector (v) now includes only zero (0) entries and one (1) entries.

The predetermined value (K) is a variable that is selected based on the error of the airport surveillance equipment and based on the number of data points provided over a particular time amount of time. The predetermined value (K) is typically between 5 and 15, and often between 8 and 12. The predetermined value (K) in the present case is equal to 10.

The next step is to replace any zero (0) entries in the vector (v) with a one (1) entry if the zero (0) entry is a part of a sequence of consecutive zero (0) entries where the sequence of zero (0) entries includes fewer entries than a predetermined value (S).

The predetermined value (S) is a variable that is selected based on the error of the airport surveillance equipment and based on the number of data points provided over a particular time amount of time. The predetermined value (S) is typically between 2 and 10, and often between 4 and 8. The predetermined value (S) in the present case is equal to 5.

The resulting vector (v) is as shown below in Table 3.

TABLE 3

| Completed Vector (v) | |
|---|---|
| Data Point (index) | Vector (v) |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 0 |
| 19 | 0 |
| 20 | 1 |
| 21 | 1 |
| 22 | 1 |
| 23 | 1 |
| 24 | 1 |
| 25 | 1 |
| 26 | 1 |
| 27 | 1 |
| 28 | 1 |
| 29 | 1 |
| 30 | 1 |
| 31 | 1 |
| 32 | 1 |
| 33 | 1 |
| 34 | 1 |
| 35 | 1 |
| 36 | 1 |
| 37 | 1 |
| 38 | 1 |
| 39 | 1 |
| 40 | 1 |
| 41 | 1 |
| 42 | 1 |
| 43 | 1 |
| 44 | 1 |
| 45 | 1 |
| 46 | 1 |
| 47 | 1 |
| 48 | 1 |
| 49 | 1 |
| 50 | 1 |
| 51 | 1 |

TABLE 3-continued

| Completed Vector (v) | |
|---|---|
| Data Point (index) | Vector (v) |
| 52 | 1 |
| 53 | 1 |
| 54 | 1 |
| 55 | 1 |
| 56 | 1 |
| 57 | 1 |
| 58 | 1 |
| 59 | 1 |
| 60 | 1 |
| 61 | 1 |
| 62 | 1 |
| 63 | 1 |
| 64 | 1 |
| 65 | 1 |
| 66 | 1 |
| 67 | 1 |
| 68 | 1 |
| 69 | 1 |
| 70 | 1 |
| 71 | 1 |
| 72 | 1 |
| 73 | 1 |
| 74 | 1 |
| 75 | 1 |

The next step is to define a starting index and a stopping index within the vector (v) for each sequence of consecutive one (1) entries, because each sequence of one (1) entries defines a proposed knot. In the present example, there is only one sequence of consecutive (1) entries indicated that there is only one proposed knot identified, the proposed knot corresponding to knot 240. Accordingly, the starting index for the proposed knot is 20, and the ending entry for the proposed knot is 75. Please note that the first method fails to identify knot 230 as a proposed knot (see FIG. 4).

Next, stray data points are to be removed from being associated with the proposed knot. These stray points, because of their distances from the center of the proposed knot, should not be associated with the proposed knot. To accomplish this removal, the first step is to calculate a mean location (E(x), E(y)) for the proposed knot, the calculation using any of the techniques well known in the art. The next step is to calculate a radial distance (kr) between the mean location (E(x), E(y)) of the proposed knot and the (x) and (y) coordinates of each respective data point corresponding to the sequence of consecutive (1) entries in the proposed knot. Each of the radial distances (kr) is equal to (=) $[(x_i-E(x))^2+(y_i-E(y))^2]^{1/2}$.

The next step in the removal of stray data points is to compute a scale factor (m), where m is equal to (=) $m=\log_e(\text{length }(r))/OSR$. The predetermined variable (OSR) is a variable that is selected based on the error of the airport surveillance equipment and based on the number of data points provided over a particular time amount of time. The predetermined variable (OSR) is typically between 5 and 10. The predetermined variable (OSR) in the present case is equal to 7.

The next step in the removal of stray data points is to drop any data points 210 from being associated with the proposed knot if its respective radial distance (kr), calculated above, exceeds an average of all the radial distances (kr) for the proposed knot plus (+) the scale factor (m), calculated above, times (*) a standard deviation of all the radial distances (kr) associated with the proposed knot. In the present example, there were no stray data points removed.

The next step is to eliminate any proposed knots that have less that than a predetermined number (d) of data points remaining. The predetermined number (d) is a variable that is selected based on the error of the airport surveillance equipment and based on the number of data points provided over a particular time amount of time. The predetermined number (d) is typically between 2 and 15, and often between 5 and 10. The predetermined number (d) in the present case is equal to 5. Because the present proposed knot (knot 240) includes fifty-six data points 210, it is not removed.

Figure 3:
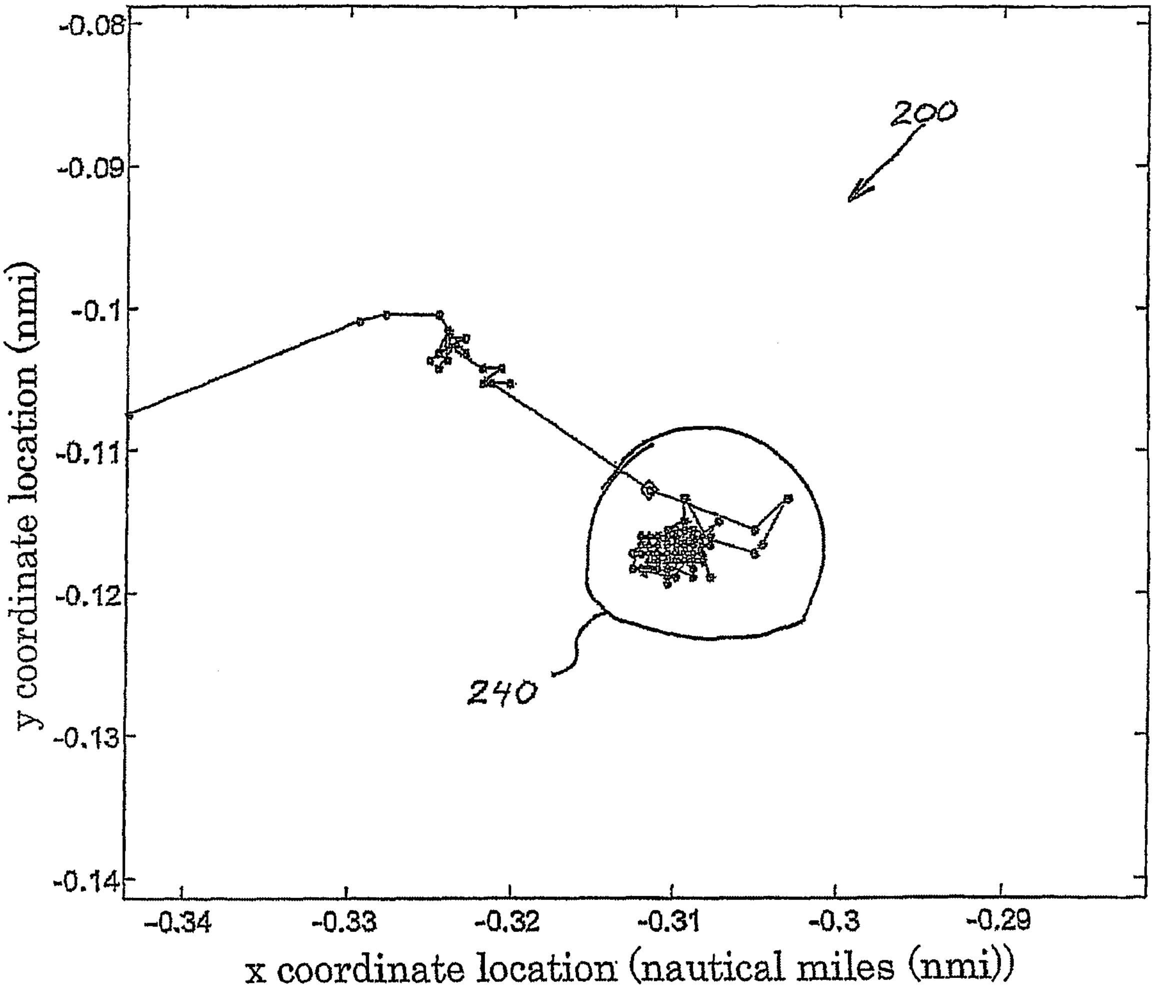
FIG. 3 is the Cartesian plot of data points from FIG. 2 indicating the preliminary holds found using a method in accordance with a first embodiment of the present invention.

The data points associated with the remaining proposed knot can be output to hard copy, or saved on a computer readable medium for review and analysis by a user. An output can also be made to a hard copy or computer readable medium identifying the holding location(s) and the holding duration (s) of the particular aircraft for use by others. The proposed knot (knot 240) identified by this first method is shown in FIG. 3.

A second method of identifying preliminary holds is described as follows using the sequence 200 of data points 210 shown in FIG. 2 as an example.

The first step in the second method is to create a vector (sv) similar to the vector (v) discussed above in so far as there is a single element in the vector (sv) for each data point 210 in the sequence 200 that defines the path 220. The next step is to determine the estimated ground speed of the aircraft at each data point 210 using any of the many methods well known in the art, and entering the estimated ground speed into the vector (sv). It should be understood that the ground speed can be one of the pieces of information provided with each data point 210 and/or can be estimated using the locations of the data points 210 in relation to the time stamps.

The next step is to replace all of the ground speed entries in the vector (sv) with a zero (0) entry or a one (1) entry. The one (1) entry is to be used if the ground speed is less than a predetermined minimum ground speed ($GS_{min}$) or if Vg=NaN (i.e., not a number), and the zero (0) entry is to be used if the ground speed is equal to or greater than the predetermined minimum ground speed ($GS_{min}$) and the ground speed value is not a NaN. The predetermined minimum ground speed ($GS_{min}$) is a variable that is selected based on the error of the airport surveillance equipment and based on the number of data points provided over a particular time amount of time. The predetermined minimum ground speed ($GS_{min}$) is typically between 1 and 5 knots, and often between 1 and 3 knots. The predetermined value (S) in the present case is equal to 1.9 knots.

The next step is to define a start index and a stop index within the vector (sv) for each sequence of consecutive one (1) entries, each of the sequences of consecutive one (1) entries defining a proposed knot.

The next step is to define a holding duration for each of the identified proposed knots. The hold duration can be determined by subtracting the time stamps on the start index and the stop index. If a proposed knot has a duration less than a predetermined time duration (T), the proposed knot is to be no longer considered a proposed knot. The predetermined time duration (T) is a variable that is selected based on the error of the airport surveillance equipment and based on the number of data points provided over a particular time amount of time. The predetermined time duration (T) is typically between 10 and 120 seconds. The predetermined time duration (T) in the present case is 30 seconds.

Next, stray data points are to be removed from being associated with the proposed knot. These stray points, because of their distances from the center of the proposed knot, should not be associated with the proposed knot. To accomplish this removal, the first step is to calculate a mean location (E(x), E(y)) for each proposed knot using any of the techniques well known in the art. The next step is to calculate a radial distance (pr) between the mean location (E(x), E(y)) of the proposed knot and the (x) and (y) coordinates of each respective data point corresponding to the sequence of consecutive one (1) entries in the proposed knot. Each of the radial distances (pr) is equal to $[(x_i-E(x))^2+(y_i-E(y))^2]^{1/2}$.

The next step in the removal of stray data points is to compute a scale factor (m), where $m=\log_e(\text{length } (r))/OSR$. The predetermined variable (OSR) is a variable that is selected based on the error of the airport surveillance equipment and based on the number of data points provided over a particular time amount of time. The predetermined variable (OSR) is typically between 5 and 10. The predetermined variable (OSR) in the present case is equal to 7.

The next step in the removal of stray data points is to keep data points associated with the proposed knot if r is less than the larger of the two values from the inequality, $r<\max(\text{maxDistance}, m\cdot \text{std}(r))$. For example, maxDistance can be a value between 50 feet and 100 feet.

The next step in the second method is to merge any of the remaining proposed knots with data points 210 that overlap.

Figure 4:
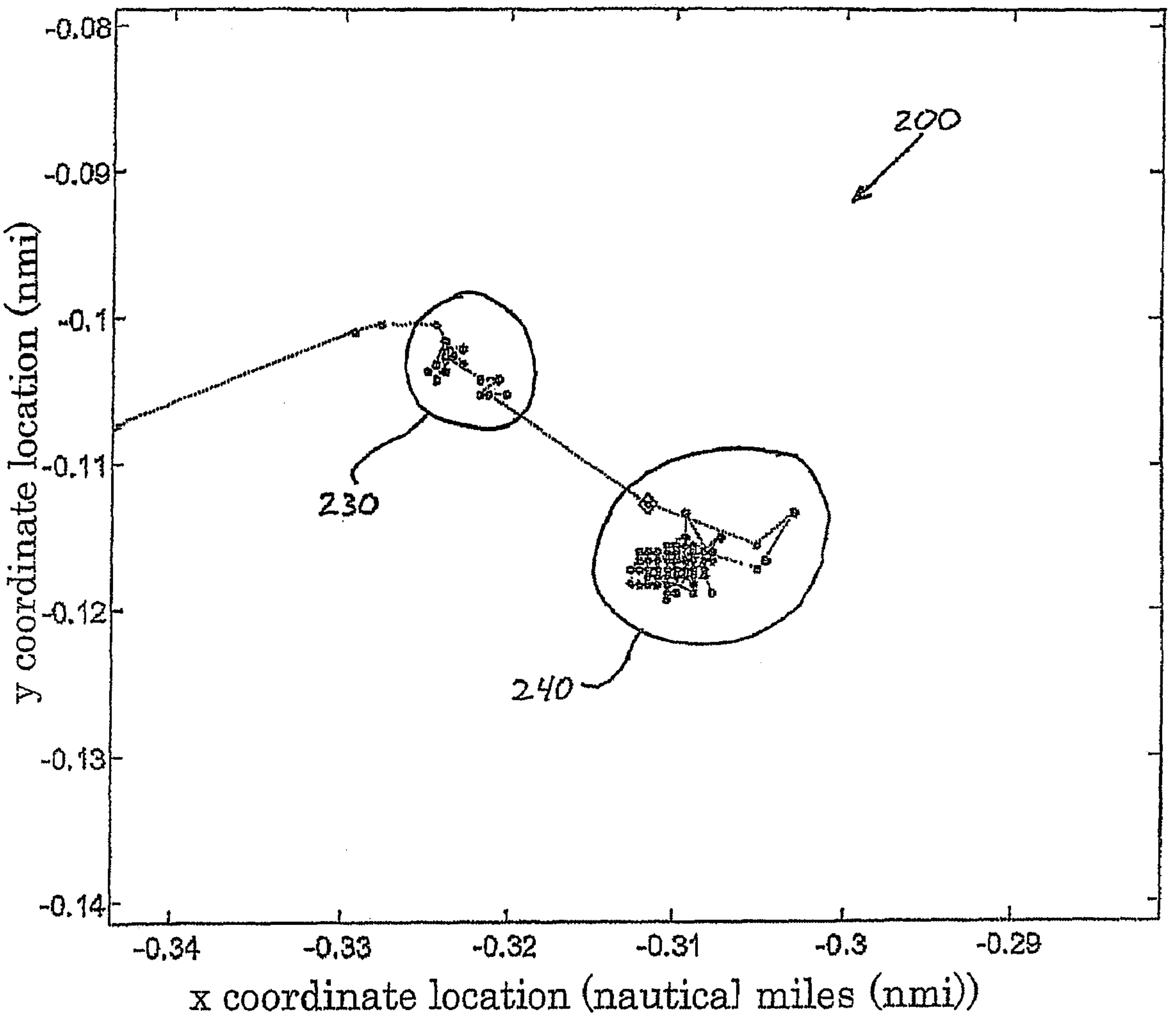
FIG. 4 is the Cartesian plot of the data points from FIG. 2 indicating the preliminary holds found using a method in accordance with a second embodiment of the present invention.

The data points associated with the remaining proposed knots can be output to hard copy, or saved on a computer readable medium for review and analysis by a user. An output can also be made to a hard copy or computer readable medium identifying the holding location(s) and the holding duration (s) of the particular aircraft for use by others. The two proposed knots identified by this second method are shown in FIG. 4.

Proposed knots identified by the first method and by the second method can be merged together because there is a high likelihood that the first method will identify a proposed knot that was not identified by the second method, and vise versa. It should be understood, however, that there will be no knots identified if both the first and second methods fail to identify any proposed knots.

If the first method identifies a proposed knot including data points that are not identified as part of a proposed knot by the second method, the proposed knots from both the first and second methods are merged. Similarly, if the second method identifies a proposed knot including data points that are not identified as part of a proposed knot by the first method, the proposed knots from both the first and second methods are merged.

If the first method identifies a proposed knot with individual locations that overlap, supersede, or are subsumed by the individual locations of one of the proposed knots identified by the second method, the data is merged into a new proposed knot such that the resultant list of data points associated with the new proposed knot is a superset of the list of data points from both proposed knots. Similarly, If the second method identifies a proposed knot with individual locations that overlap, supersede, or are subsumed by the individual locations of one of the proposed knots identified by the first method, the data is merged into a new proposed knot such that the resultant list of data points associated with the new proposed knot is a superset of the list of data points from both proposed knots.

The data points associated with the resulting preliminary knots can be output to hard copy, or saved on a computer readable medium for review and analysis by a user. An output can also be made to a hard copy or computer readable medium identifying the holding location(s) and the holding duration (s) of the particular aircraft for use by others.

Figure 5:
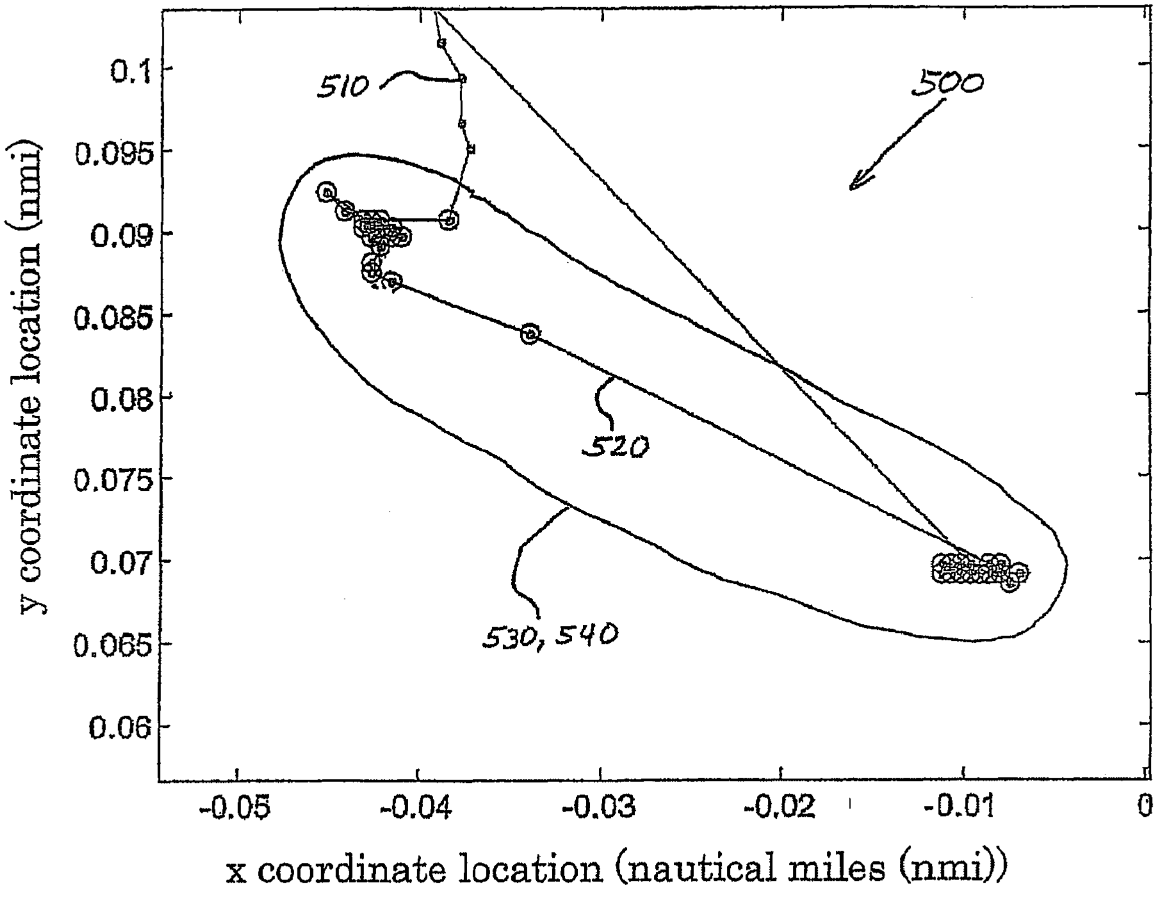
FIG. 5 is a Cartesian plot of data points for a third aircraft path, the data points including those identified as being a preliminary knot by a combination of the method performed in accordance with the first embodiment and the method performed in accordance with the second embodiment.

As an example, FIG. 5 shows a sequence 500 of data points 510 that define a path 520 including two proposed knots 530, 540 that were merged using the method described above. As can easily be seen, the two preliminary knots 530, 540 should not have been merged as they appear to indicate two separate holding locations. Accordingly, a fourth method can be used to separate improperly merged proposed knots.

The first step in the fourth method is to convert all of the (x) and (y) coordinates for each data point associated with each of the remaining proposed knots into a row/column address, as shown below in Table 5.

TABLE 5

Data Points 510 from Proposed Knots Identified in the Sequence 500 and Their Associated Grid Adress

| Data Point | (x) Coordinates (Grid Columns) | | (y) Coordinates (Grid Rows) | |
|---|---|---|---|---|
| (Index) | Actual | Grid | Actual | Grid |
| 1 | −0.0097 | 15 | 0.0697 | 1 |
| 2 | −0.0086 | 15 | 0.0691 | 1 |
| 3 | −0.0086 | 15 | 0.0697 | 1 |
| 4 | −0.0086 | 15 | 0.0697 | 1 |
| 5 | −0.0086 | 15 | 0.0697 | 1 |
| 6 | −0.0081 | 16 | 0.0697 | 1 |
| 7 | −0.0076 | 16 | 0.0686 | 1 |
| 8 | −0.0086 | 15 | 0.0691 | 1 |
| 9 | −0.0103 | 15 | 0.0691 | 1 |
| 10 | −0.0103 | 15 | 0.0691 | 1 |
| 11 | −0.0103 | 15 | 0.0691 | 1 |
| 12 | −0.0103 | 15 | 0.0697 | 1 |
| 13 | −0.0103 | 15 | 0.0697 | 1 |
| 14 | −0.0103 | 15 | 0.0691 | 1 |
| 15 | −0.0108 | 14 | 0.0697 | 1 |
| 16 | −0.0108 | 14 | 0.0697 | 1 |
| 17 | −0.0113 | 14 | 0.0697 | 1 |
| 18 | −0.0108 | 14 | 0.0697 | 1 |
| 19 | −0.0103 | 15 | 0.0697 | 1 |
| 20 | −0.0092 | 15 | 0.0691 | 1 |
| 21 | −0.0097 | 15 | 0.0691 | 1 |
| 22 | −0.0697 | 15 | 0.0691 | 1 |
| 23 | −0.0108 | 14 | 0.0691 | 1 |
| 24 | −0.0113 | 14 | 0.0691 | 1 |
| 25 | −0.0108 | 14 | 0.0691 | 1 |
| 26 | −0.0108 | 14 | 0.0691 | 1 |
| 27 | −0.0113 | 14 | 0.0691 | 1 |
| 28 | −0.0108 | 14 | 0.0697 | 1 |
| 29 | −0.0108 | 14 | 0.0697 | 1 |
| 30 | −0.0097 | 15 | 0.0691 | 1 |
| 31 | −0.0092 | 15 | 0.0691 | 1 |
| 32 | −0.0092 | 15 | 0.0691 | 1 |
| 33 | −0.0086 | 15 | 0.0691 | 1 |
| 34 | −0.0092 | 15 | 0.0691 | 1 |
| 35 | −0.0086 | 15 | 0.0691 | 1 |
| 36 | −0.007 | 16 | 0.0691 | 1 |
| 37 | −0.0081 | 16 | 0.0691 | 1 |
| 38 | −0.0081 | 16 | 0.0697 | 1 |
| 39 | −0.0086 | 15 | 0.0697 | 1 |
| 40 | −0.034 | 5 | 0.0837 | 7 |
| 41 | −0.0416 | 2 | 0.0869 | 8 |
| 42 | −0.0427 | 2 | 0.0875 | 8 |
| 43 | −0.0427 | 2 | 0.088 | 8 |
| 44 | −0.0416 | 2 | 0.0896 | 9 |
| 45 | −0.0454 | 1 | 0.0923 | 10 |
| 46 | −0.0443 | 1 | 0.0913 | 10 |
| 47 | −0.0427 | 2 | 0.0907 | 9 |
| 48 | −0.0432 | 1 | 0.0902 | 9 |
| 49 | −0.0427 | 2 | 0.0902 | 9 |
| 50 | −0.0432 | 1 | 0.0902 | 9 |
| 51 | −0.0432 | 1 | 0.0902 | 9 |
| 52 | −0.0427 | 2 | 0.0902 | 9 |
| 53 | −0.0427 | 2 | 0.0902 | 9 |
| 54 | −0.0432 | 1 | 0.0902 | 9 |
| 55 | −0.0432 | 1 | 0.0902 | 9 |
| 56 | −0.0427 | 2 | 0.0896 | 9 |
| 57 | −0.0421 | 2 | 0.0891 | 9 |
| 58 | −0.0421 | 2 | 0.0902 | 9 |
| 59 | −0.0421 | 2 | 0.0902 | 9 |
| 60 | −0.0432 | 1 | 0.0907 | 9 |
| 61 | −0.0427 | 2 | 0.0907 | 9 |
| 62 | −0.0416 | 2 | 0.0902 | 9 |
| 63 | −0.041 | 2 | 0.0896 | 9 |
| 64 | −0.041 | 2 | 0.0896 | 9 |
| 65 | −0.041 | 2 | 0.0896 | 9 |
| 66 | −0.0427 | 2 | 0.0896 | 9 |
| 67 | −0.0427 | 2 | 0.0896 | 9 |
| 68 | −0.0427 | 2 | 0.0896 | 9 |
| 69 | −0.0427 | 2 | 0.0896 | 9 |
| 70 | −0.0427 | 2 | 0.0896 | 9 |
| 71 | −0.0427 | 2 | 0.0896 | 9 |
| 72 | −0.0427 | 2 | 0.0896 | 9 |
| 73 | −0.0421 | 2 | 0.0907 | 9 |
| 74 | −0.0383 | 3 | 0.0907 | 9 |

Figure 6:
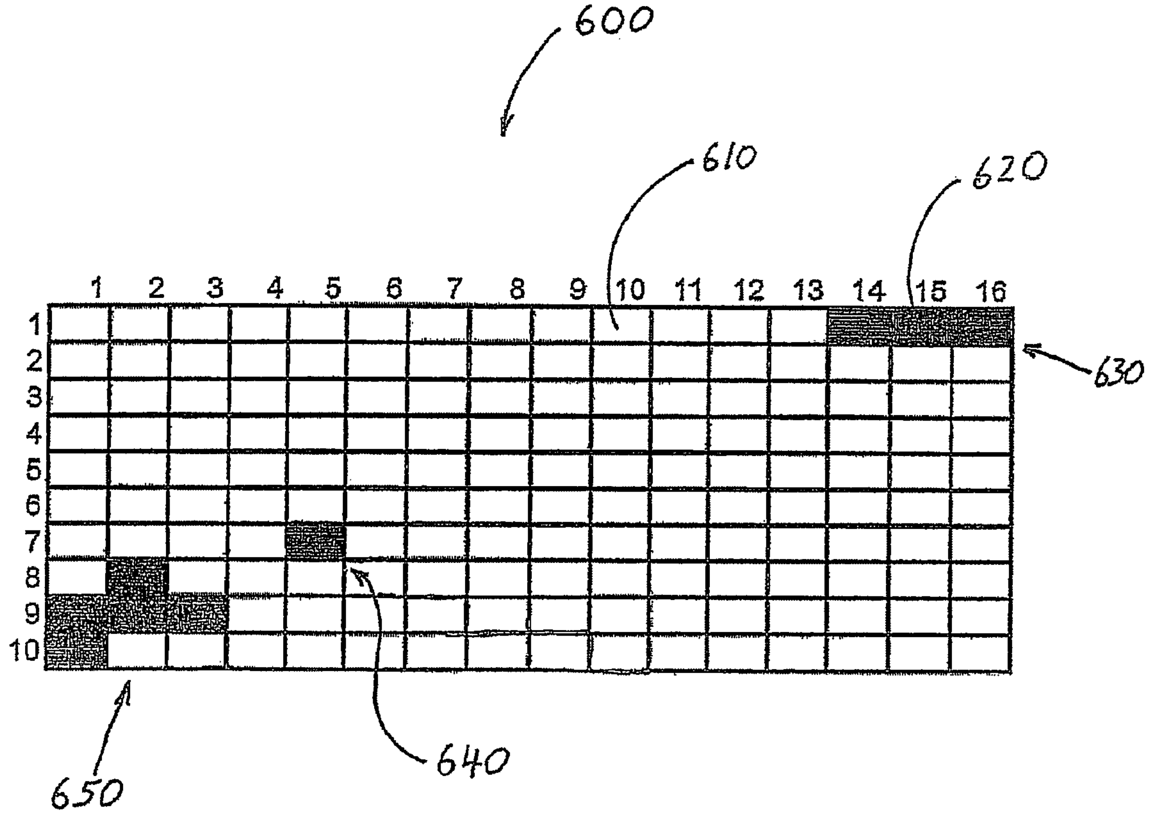
FIG. 6 is a two-dimensional grid including populated cells corresponding to the preliminary hold shown as being identified in FIG. 5.

As shown in FIG. 6, each row/column grid address falls into one of a plurality of two-dimensional cells 610 arranged in a two-dimensional grid 600. The grid 600 has a predetermined spacing (gs). The predetermined spacing (gs) is a variable that is selected based on the error of the airport surveillance equipment and the size of the airport surface environment. The predetermined spacing (gs) is typically between 5 and 50 feet. The predetermined spacing (gs) in the present case is equal to 15 feet.

Each of the cells 610 in the grid 600 having at least one data point 500 falling therein is darkened and will be referred to as being an active cell 620.

The next step is to determine recursively a list of clusters 630, 640, 650 of active cells 620 that are comprised of contiguous active cells 620. The active cells 620 of these clusters 630,640, 650 are separated by a distance of less (<) than or equal to (=)$\sqrt{2}$ times (*) the distance measured from the center of an active cell to the center of another active cell. Any of the clusters whose distances are not greater than (>) than $\sqrt{2}$ times the distance measured from a center of active cell 620 to a center of neighboring active cell 620, are to be grouped together. The remaining clusters 630, 650 represent a hold.

Figure 7:
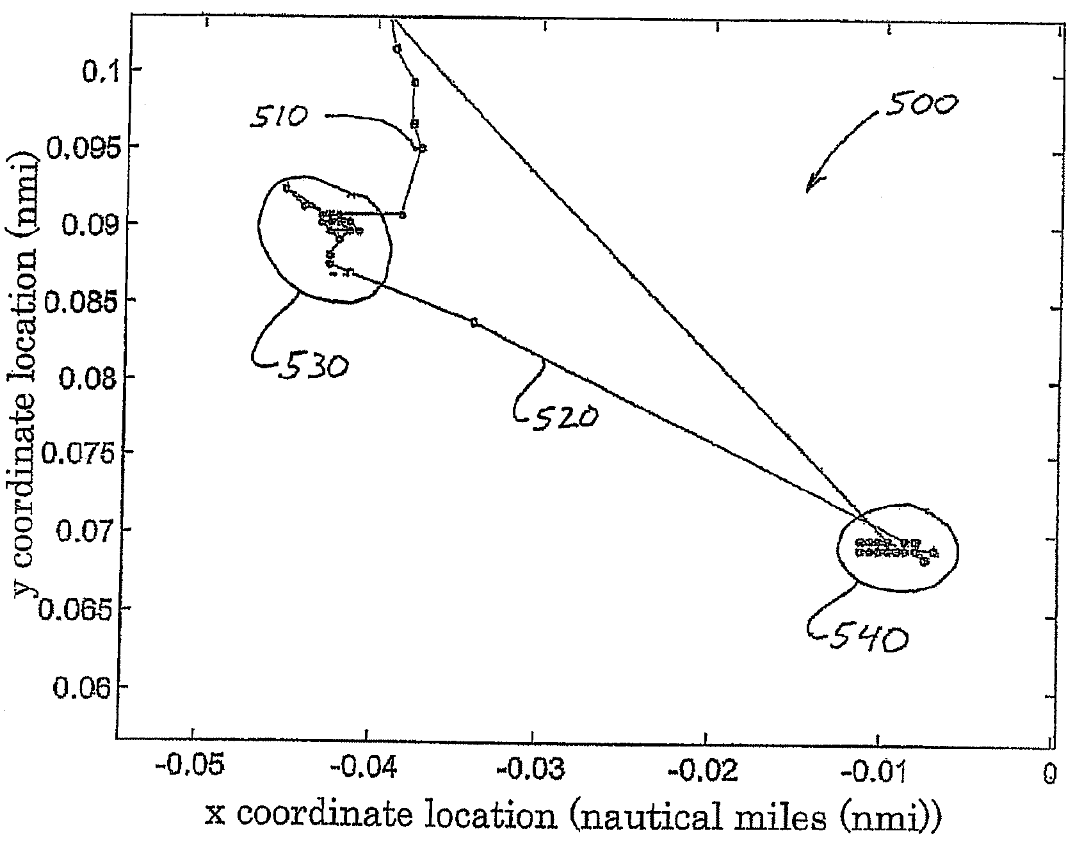
FIG. 7 is a Cartesian plot of the data points of FIG. 5, the data points corresponding to two separate holds being identified.

By correlating the remaining clusters 630, 650 identified by using the fourth method back to the original data points 510 in the sequence 500, the data points 510 can now be associated with a knot that accurately represent a hold, as shown in FIG. 7 as the remaining clusters 630, 650. The data points 510 associated with the remaining clusters 630, 650 can be output to hard copy, or saved on a computer readable medium for review and analysis by a user. An output can also be made to a hard copy or computer readable medium identifying the holding location(s) and the holding duration(s) of the particular aircraft for use by others.

While the present invention has been particularly shown and described with reference to the preferred mode as illustrated in the drawings, it will be understood by one skilled in the art that various changes may be effected therein without departing from the spirit and the scope of the invention as defined by the claims.

What is claimed is:

1. A method using airport surveillance data to output a location of a delay and an amount of time a vehicle is subjected to the delay during a movement of the vehicle between a first location and a second location, the method comprising:

obtaining a time-ordered sequence of data points representing the movement of the vehicle, each data point including an (x) position coordinate and a (y) position coordinate, at a particular time represented by a time stamp;

creating a vector (sv) including a plurality of elements, each of the elements corresponding to a respective one of the data points from the time ordered sequence, each of the elements being a ground speed associated with the respective data point;

replacing all of the ground speed entries in the vector (sv) with one of a zero (0) entry and a one (1) entry; the one (1) entry if the ground speed entry is less than the predetermined minimum ground speed ($GS_{min}$) or if the ground speed is not a number, the zero (0) entry if the ground speed is equal to or greater than the predetermined minimum ground speed ($GS_{min}$) and the ground speed value is not a number;

defining a starting index and a stopping index within the vector (sv) for each sequence of consecutive one (1) entries, each of the sequences of consecutive one (1) entries defining a proposed knot;

defining a time duration of each of the proposed knots using the time stamps of the respective data points;

eliminating any proposed knot having a duration of less than a predetermined time duration (T);

performing the following steps for each remaining proposed knot (ki):

finding a mean location (E(x), E(y)) for the proposed knot (pi), the mean location being the average of the (x) and (y) coordinates of data points in the sequence of consecutive (1) entries in the proposed knot (pi);

calculating a radial distance (pr) between the mean location (E(x), E(y)) of the proposed knot (pi) and the (x) and (y) coordinates of each respective data point corresponding to the sequence of consecutive (1) entries in the proposed knot (pi), each radial distance (pr) being equal to $[(x_i-E(x))^2+(y_i-E(y))^2]^{1/2}$;

computing a scale factor (m) where $m=\log_e(\text{length}(pr))/OSR$, wherein OSR is a predetermined variable; and keeping data points associated with the proposed knot if pr is less than the larger of the two values from the inequality $pr<\max(\text{maxDistance}, m\cdot\text{std}(pr))$;

merging any of the proposed knots that overlap;

identifying the data points associated with any remaining proposed knot as being associated with the respective proposed knot; and saving the data points identified onto a computer readable medium for at least one of review by an individual, production of a graphical display on a computer terminal, and production of a presentation document identifying those data points as being associated with one of the proposed knots.

2. The method according to claim 1, wherein the predetermined minimum ground speed ($GS_{min}$) is between 1 and 5 knots.

3. The method according to claim 1, wherein the predetermined minimum ground speed ($GS_{min}$) is between 1 and 3 knots.

4. The method according to claim 1, wherein the predetermined minimum ground speed ($GS_{min}$) is 1.9 knots.

5. The method according to claim 1, wherein the predetermined time duration (T) is between 10 seconds and 120 seconds.

6. The method according to claim 1, wherein the predetermined time duration (T) is 30 seconds.

7. The method according to claim 1, wherein the predetermined variable (OSR) is between 5 and 10.

8. The method according to claim 1, wherein the predetermined variable (OSR) is 7.

9. The method according to claim 1, wherein the vehicle is an aircraft.

* * * * *